United States Patent [19]
Strobel et al.

[11] 3,789,937
[45] Feb. 5, 1974

[54] ELECTRICAL BALANCE INCLUDING MONITORING MEANS

[75] Inventors: Felix Strobel, Greifensee; Heinz Allenspach, Fallenden, both of Switzerland

[73] Assignee: Mettler Instrumente AG, Zurich, Switzerland

[22] Filed: June 25, 1973

[21] Appl. No.: 373,003

[30] Foreign Application Priority Data
June 27, 1972 Switzerland.......................... 9601/72

[52] U.S. Cl.............................. 177/210, 177/DIG. 3
[51] Int. Cl............................................... G01g 3/14
[58] Field of Search............ 177/DIG. 1, DIG. 3, 210

[56] References Cited
UNITED STATES PATENTS

| | | | |
|---|---|---|---|
| 3,039,686 | 6/1962 | Bell et al........................ | 177/DIG. 3 |
| 3,061,026 | 10/1962 | Hecox et al..................... | 177/DIG. 3 |
| 3,247,915 | 4/1966 | Chilton.......................... | 177/210 X |
| 3,493,773 | 2/1970 | Power............................ | 177/210 X |
| 3,674,097 | 7/1972 | Gila.............................. | 177/DIG. 3 |
| 3,709,309 | 1/1973 | Wilhams, Jr. et al........... | 177/210 X |

Primary Examiner—George H. Miller, Jr.
Attorney, Agent, or Firm—Lawrence E. Laubscher

[57] ABSTRACT

An improved electrical balance is disclosed of the type including stationary and load-responsive movable components, means being provided for supplying to signal evaluating means an analog load signal having a function that varies with load, said evaluation means being periodically operable during successive measuring periods to produce digitalized measurements that correspond with the load. The invention is characterized by the provision of balance monitoring means that disable the evaluation means in the event that movement of the movable balance component exceeds predetermined limits during the measurement period. The monitoring means further effects the transfer of each digitalized measurement result to associated data storage means only when the movement of the movable component has not exceeded the predetermined limits during the corresponding measurement period. In balances including load compensation means, the load signal may be the compensation current that is supplied to the compensation coil means.

12 Claims, 8 Drawing Figures

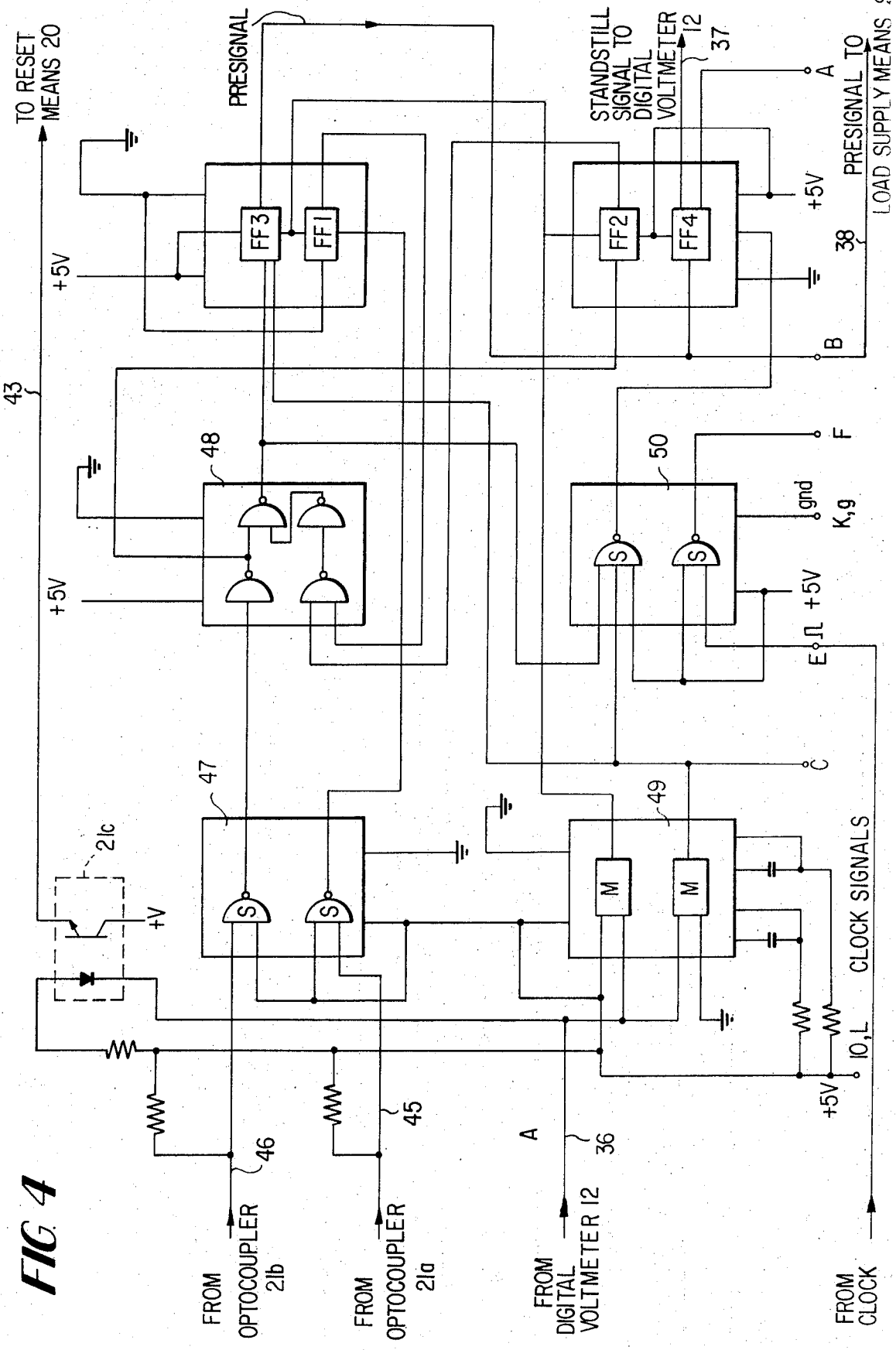

ELECTRICAL BALANCE INCLUDING MONITORING MEANS

It is well known in the patented prior art to provide electrical balances which include a frame, load-carrier means movable relative to the frame, measuring means influenced by said load-carrier means, and means responsive to said measuring means for counting a succession of counting pulses to periodically produce a digital measurement result. According to one embodiment (as illustrated, for example, by the Strobel U.S. Pat. No. 3,688,854 of Sept. 5, 1972), the balance includes electromagnetic compensation means for returning the load-carrier means to its zero position when the load-carrier means is deflected by a load placed thereon, together with digital voltmeter means which measure the magnitude of the compensation current—which in turn is proportional to the load to be measured—by means of a measuring resistor and represent the measurement in digital form. In a second embodiment represented by the pending U.S. Pat. application of Heinz Allenspach Ser. No. 244,054 of Apr. 14, 1972, entitled "Force Measuring Apparatus Including Totalizer Means," the compensation current supplied to the compensation means is in the form of pulses the lengths of which are counted by means of constant frequency counting pulses which are totalized to represent the weight of the load being measured. Finally, in a third embodiment (represented, for example, by the U.S. Pat. application of Heinz Allenspach et al, Ser. No. 277,162 filed Aug. 2, 1972, entitled "Force Measuring Apparatus Including Sensitivity Selection Means"), use is made of pre-tensioned string means that are connected between stationary and movable components of the balance and are electromechanically excited to a state of transverse vibration, the variations in the frequency of vibration of the string means that occur when the application of load to the movable component being measured by counting pulses to give an indication of the magnitude of the load.

The present invention was developed for use with the above and other types of balance arrangements wherein measurement values proportional to weight are electrically represented periodically in the form of digital measurement results.

One inherent drawback of such balances is that weighing results are often falsified by the deleterious effect of vibrations, such as interference vibrations transmitted to the balance from external sources, or vibrations produced by the long being measured (in the case of livestock, for example).

In addition, after the balance has been loaded with material to be weighed, it must first settle into a rest or equilibrium position before a meaningful result can be obtained. This latter factor is particularly important when weighing articles which are supplied in rapid succession to the balance, for example in the case of tablet weighing balances incorporated in conveyor systems.

The difficulties caused by these vibrations increase in direct proportion to any increase in the desired precision of indication of the balance, and form one of the most frequent sources of error. Previously, when a balance operator wished to read off a weighing result, he had to wait until the weight indication had reached a stable condition, and this frequently caused a strain on the operator, rapidly resulting in fatigue. The present invention was developed to avoid the above and other drawbacks inherent in such weighing systems.

Accordingly, a primary object of the present invention is to provide a weighing apparatus including a balance having stationary and load-responsive movable components, means for generating a load signal that varies as a function of the load applied to the movable component, analog-to-digital signal evaluation means operable during successive measuring periods for providing digital representations of the load signal and, consequently, the weight of the load on said movable component, and balance monitoring means for disabling said signal evaluation means when the movable component (and, consequently, the load signal) exceed predetermined limits during a given measurement period, whereby the delivery of inaccurate digital measurements by the evaluation means is avoided. Preferably the load signal evaluation means—which may comprise a digital voltmeter, pulse counter means, or the like—includes a display means and is connected with a storage device that stores the successive digital measurements, said balance monitoring means being operable to permit the transmittal of a digitalized measurement result to said storage means only after a measuring period during which the movable component has remained within the predetermined limits.

According to a more specific object of the invention, the balance monitoring means include means defining within the first set of predetermined limits a lower set of limits. In the event that the movable component exceeds the larger limits during a given measuring period, the display signal evaluation means remains in a disabled condition until the next measuring period, and consequently the digitalized measurement result cannot be transmitted to the storage means. On the other hand, in the event that the lower limits are twice exceeded during a given measuring period (without exceeding the upper limits), the display of the signal evaluation means is enabled after said given measuring period and the digitalized measurement value is transmitted to the storage means at the end of the measuring period.

A further object of the present invention is to provide a weighing apparatus of the type described wherein the balance monitoring means include time delay means operable to delay the transmittal of an approved digitalized measurement result to the display and storage means for a given period of time after the corresponding measuring period. During this time delay period, a presignal may be sent to the means that supply the load to the balance, whereby a new weighing operation may be initiated prior to the time of transmittal of the approved digitalized result.

Other objects and advantages of the invention will become apparent from a study of the following specification when viewed in the light of the accompanying drawing, in which:

FIG. 4 is a detailed electrical diagram of the digital portion of the balance monitoring means of FIG. 2;

Figure 1:
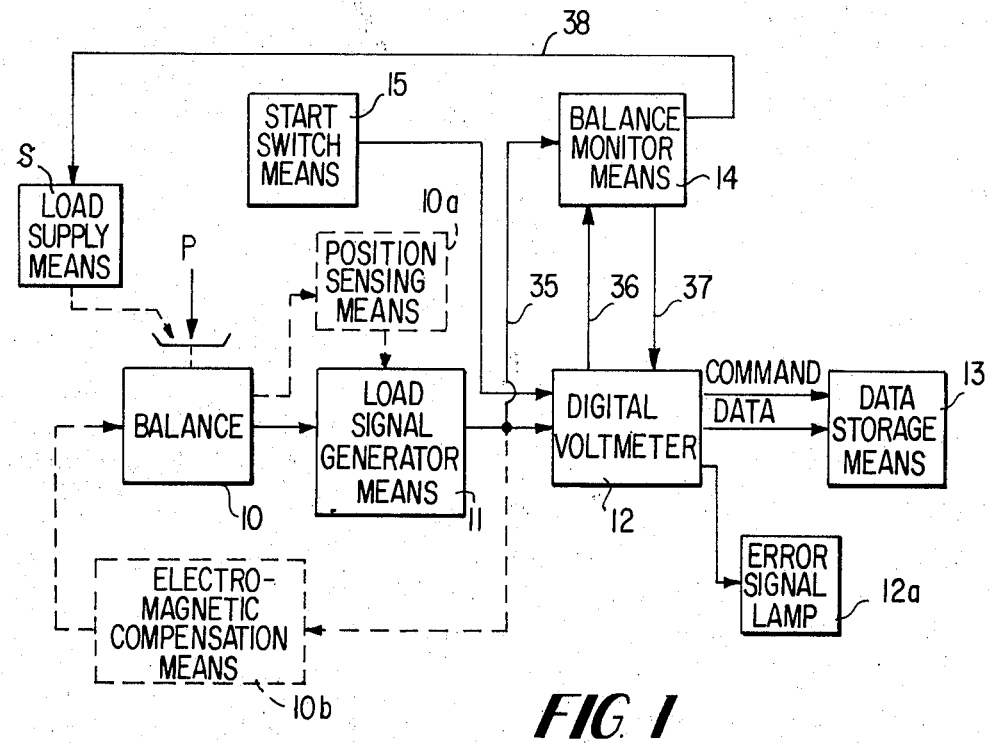
FIG. 1 is a block diagram of a first embodiment of the balance apparatus of the present invention.

Referring first more particularly to FIG. 1, the balance 10 is of the type including a stationary component and a movable component to which is applied the load P to be measured, said balance being connected with load signal generating means 11 that generate an analog signal having a property (for example, magnitude or pulse length) that is a function of the load. In the case of balance systems of the vibratory string type (illustrated, for example, in the aforementioned Allenspach U.S. application Ser. No. 277,162), the load signal generator means 11 produces a load signal that is a function of the difference in vibrating frequency that occurs with load, while in systems provided with position sensing means 10a and electromagnetic compensation means 10b (as evidenced by the Strobel U.S. Pat. No. 3,688,854 or the Allenspach application Ser. No. 244,054), the load signal generator means 11 includes a measuring amplifier, a current source, and control means for producing a load signal the magnitude of which—or, in the case where the control means include pulse length modulator means, the pulse lengths of which—is a function of load. The load signal generator means produces an analog load signal that is transmitted to the digital voltmeter 12. The digital voltmeter serves to digitalize and to transmit at regular periods (of, for example, 200 ms) to the data storage means 13 a digital signal that corresponds with the analog load signal (and thereby the load P). Preferably the digital voltmeter is of the conventional type which operates on the dual-slope principle, said digital voltmeter including a capacitor which is charged by a current proportional to the unknown voltage (rise slope) and which is discharged by a current supplied by a reference voltage of opposite polarity and known magnitude (fall slope). The total time of the rise and fall slopes is kept constant (for example, by suitable trigger circuit means), one of the slopes being counted by clock pulses the sum of which is proportional to the unknown voltage.

Start switch means 15—such as a manually operated switch or, in the case where the balance 10 is loaded automatically from load supply means S, photoelectric switch means—is operated to initiate the measurement or data transmission order, respectively.

In accordance with the present invention, balance monitoring means 14 are provided for detecting the occurrence of vibratory movement of the movable load-responsive component beyond predetermined limits relative to its equilibrium position during a given measuring period, whereupon the digital voltmeter 12 is prevented from transmitting its reading to the data storage means 13.

Figure 2:
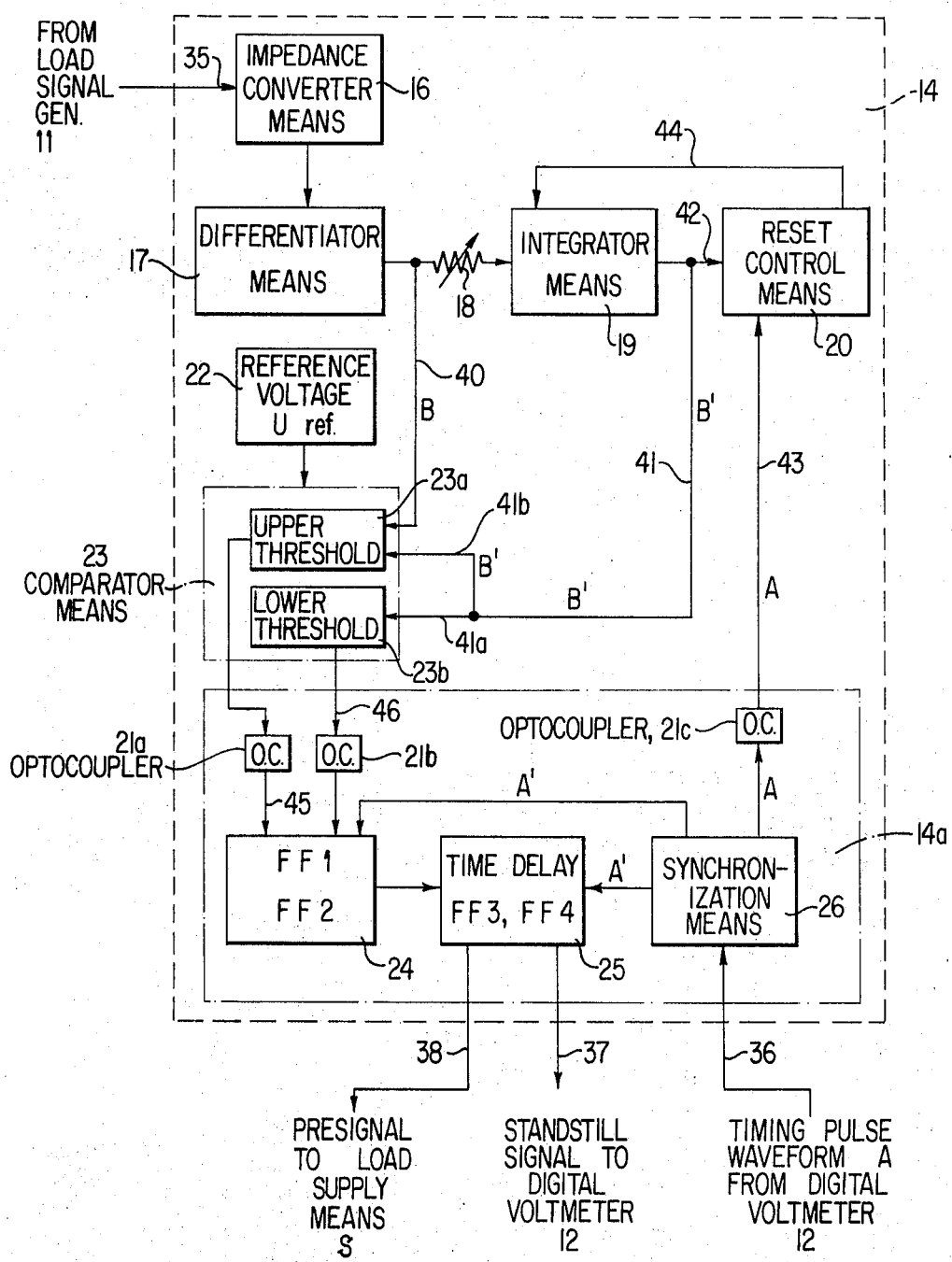
FIG. 2 is a block diagram of the balance monitoring means of FIG. 1.
Figure 3:
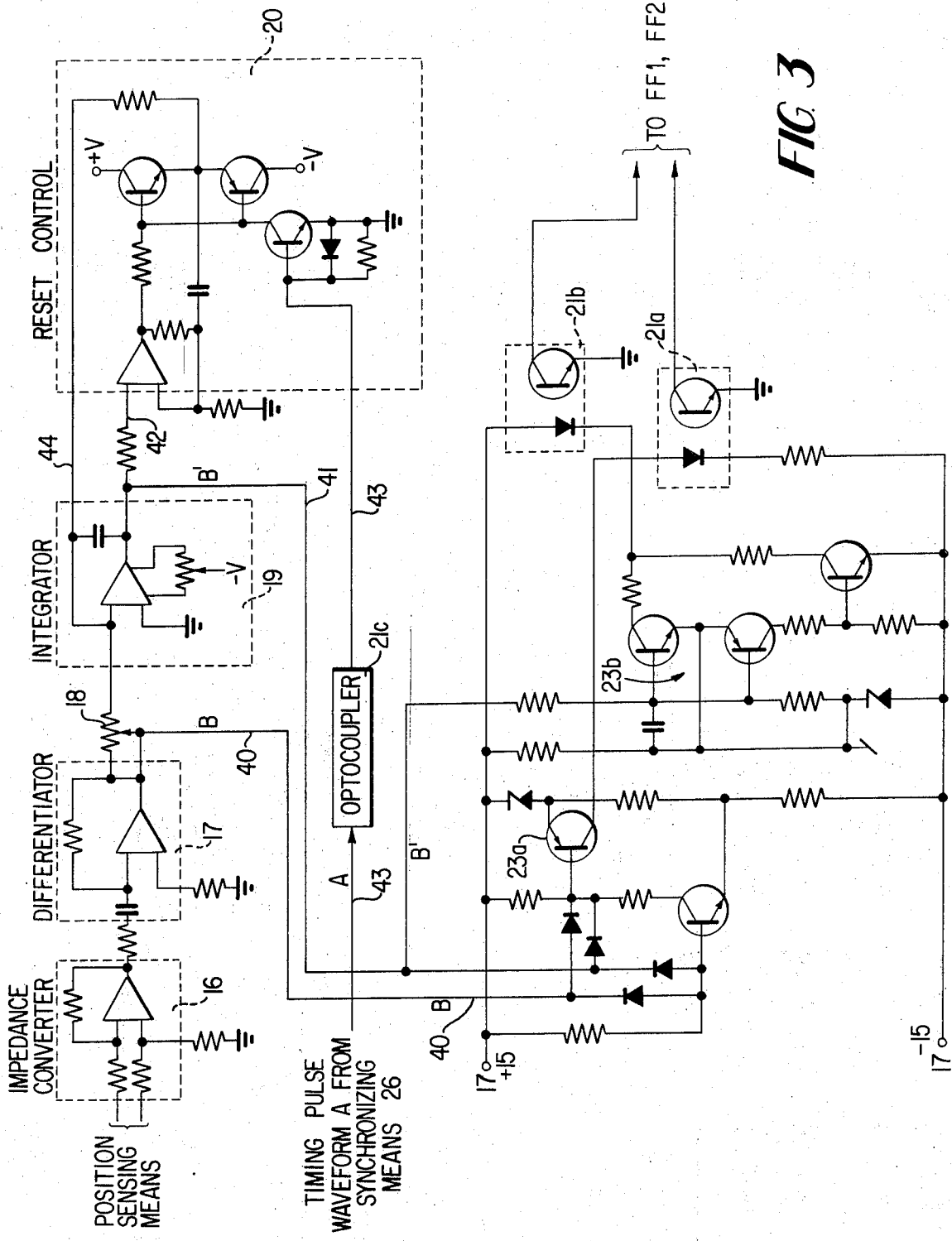
FIG. 3 is a detailed electrical schematic diagram of the analog portion of the balance monitoring means of FIG. 2, illustrating the details of the impedance converter, differentiator, integrator, reset control and comparator means.

As shown in FIGS. 1, 2 and 3, the monitoring means 14 includes a first input terminal connected by conductor 35 with the output terminal of the load signal generator means for supplying the analog load signal to impedance converter means 16, a second input terminal connected by conductor 36 with digital voltmeter 12 for supplying synchronizing timing pulses A to the synchronization means 26, a first output terminal connected by conductor 37 with digital voltmeter 12 for supplying store (i.e., standstill) signals thereto, and a second output terminal connected by conductor 38 with load supply means S for supplying a presignal thereto.

The load signal is applied—via impedance converter means 16, differentiation means 17 and conductor 40—as an input signal B to the upper threshold portion 23a of comparator means 23. A portion of the amplified load signal B is supplied via adjustable sensitivity resistor 18 for integration by integrator means 19, whereupon the integrated signal B' is applied via conductors 41, 41a and 41b to both the upper threshold portion 23a and the lower threshold portion 23b of the comparator means 23. The threshold values are preferably adjustable so that the time required for a weighing operation can be adapted to particular requirements as regards weighing precision. The integrated signal B' is also applied via conductor 42 to one input terminal of the reset control means 20. The reset control means includes a second input terminal to which are supplied via conductor 43 the clock pulses A, and an output terminal which is connected via feedback conductor 44 with the input of integrator means 19, whereby the integrator 19 begins at zero for each measurement.

As shown in FIGS. 2-4, the output terminals of the upper and lower thresholds of comparator means 23 are connected with the digital portion 14a of the balance monitoring means via conductors 45 and 46 that contain isolating optocouplers 21a and 21b, respectively The comparator threshold signals are applied to flip-flop FF1 and FF2 via logic circuit components 47 and 48, and the trigger signal A from digital voltmeter 12 is applied to flip-flops FF3 and FF4 via logic components 49 and 50.

Figure 5:
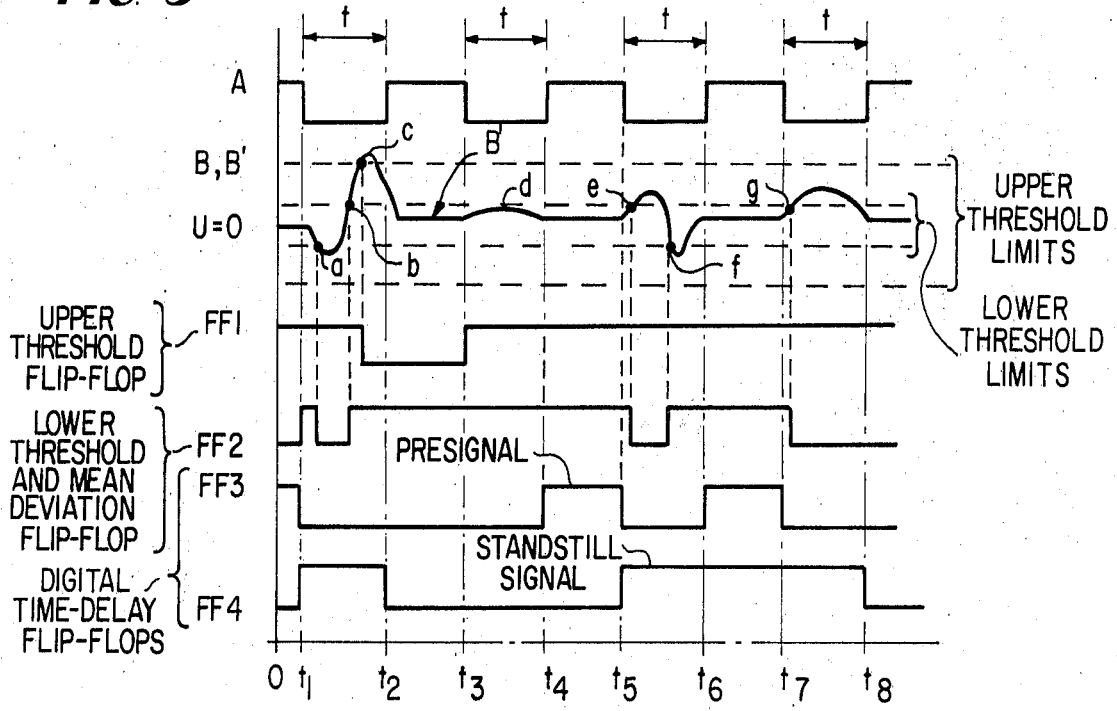
FIG. 5 is a waveform diagram illustrating the operation of the balance monitoring means of FIG. 2.

Referring now to the waveform diagram of FIG. 5, the operation of the logic portion of comparator means 23 will be described with reference to a given integrated load signal waveform B'. At time $t_1$, the timing waveform A steps down to initiate the measuring period $t$, whereupon flip-flops FF1, FF2 and FF4 are tripped to their "up" (i.e., stable) conditions, and FF3 is tripped to the "down" (i.e., unstable) condition. Flip-flop FF1 stores, in each case up to the commencement of the next measurement or control period $t$, upon each occurrence of the magnitude of the integrated load signal B' (or the non-integrated load signal B) exceeding the upper threshold value, while flip-flops FF2 is tripped from one operating state to the other each time the integrated load signal B' exceeds a lower threshold value. Thus, at point $a$ where the integrated load signal exceeds the negative threshold, flip-flop FF2 is tripped downwardly to its unstable condition, and at point $b$ where the integrated load signal swings back and again exceeds the lower limit during the same measuring period, flip-flop FF2 is tripped upwardly to its stable condition. At point $c$ where the integrated load signal exceeds the upper threshold, flip-flop FF1 is tripped downwardly to its unstable condition, with the result that at the end of the measuring period $t$ (i.e., at time $t_2$), flip-flop FF1 is in the down condition and flip-flop FF2 is in the up condition. Since flip-flops FF1 and FF2 are in different conditions, flip-flop FF3 remains in the down condition, flip-flop FF4 is tripped to the down condition, and digital voltmeter 12 is in a disabled condition.

At the beginning of the next measuring period (at time $t_3$), flip-flop FF1 is tripped again to its up condition. During this measuring period, the maximum amplitude $d$ of waveform B' did not exceed either threshold, and consequently no operation of either flip-flop FF1 or flip-flop FF2 was produced, and consequently, any measurement registered in the digital voltmeter during this measurement period would be accurate and suitable for recordation. To this end, owing to the fact that at the end of the measurement period (at time $t_4$) both flip-flops FF1 and FF2 are in the stable (up) condition, this condition is entered in the digital time delay means including flip-flops FF3 and FF4, whereupon flip-flop FF3 is tripped to the up condition to produce (during the time period between $t_4$ and $t_5$) a presignal that is supplied (as shown in FIG. 4) to flip-flop FF4 and to the load supply means S (via conductor 38), thereby to reload the balance. At the end of the time delay (i.e., at time $t_5$), the next measuring period commences, whereupon flip-flop FF3 and FF4 are tripped to their down and up conditions, respectively, with the result that flip-flop FF4 delivers to digital voltmeter 12 a standstill signal approving the transfer to the storage means 13 of the reading of the digital voltmeter (which reading, as indicated above, was taken during a measuring period in which the movement of the movable balance member was within the defined limits), During the next measuring step (between time $t_5$ and $t_6$), the load current first exceeds the lower threshold at point $e$, thereby tripping flip-flop FF2 to the down condition, but at the point $f$, the load current exceeds the lower threshold a second time during the measuring period, whereupon flip-flop FF2 is tripped back to the up condition. Consequently, at the end of the measuring period ($t_6$), both flip-flops FF1 and FF2 are in the up condition, whereupon flip-flop FF3 is stepped to the up condition, the digital voltmeter being in an enabled condition for transmitting the digitalized measurement result to the storage means (as described above). During the next measurement period, the load current exceeds the lower threshold (at point $g$), whereupon flip-flop FF2 is stepped down. Since flip-flop FF2 is in the down condition at the end of this measuring period (at time $t_8$), the digital voltmeter is disabled and no presignal and no standstill signal are generated by the flip-flops FF3 and FF4, whereupon the digitalized measurement result is not transmitted to the storage means.

A synchronizing circuit 26 effects synchronization of the duration of the measuring periods $t$ in the monitoring means 14 and the measuring periods in the digital voltmeter 12, by means of pulses A to the control means 20 and pulses A' to the digital storage means 24 and to the time delay means 25. The connection from the synchronizing circuit 26 to the control means 20 also passes by way of an optocoupler 21 so that the analog part and the digital part of the monitoring means 14 are galvanically isolated for greater accuracy.

As seen in FIG. 1 the digital voltmeter 12 has a signal lamp 12a ("error"), which is illuminated as long as the balance is not within the tolerance limits of its rest condition. It is extinguished simultaneously with the "stationary" signal from the flip-flop FF4. The correct reading can now be read off. The signal lamp 12a, or other optical or acoustic signal means, can also be used for example in the case of coarse weighing operations in which the last places of the result are not required. Thus the balance assembly will indicate a weighing result, even though the load-carrier means is not within the limits of its rest condition, this being indicated by the optical or acoustic signal means such as 12a; at the same time data transfer may also be prevented.

In the above-described embodiment, maximum sensitivity of the monitoring means 14 can be so selected that, with 10,000 digits for the weighing range, "stationary" is accepted only for those deviations of the mean value of the balance oscillations from zero, which correspond to less than 1 digit per measuring period.

Figure 6:
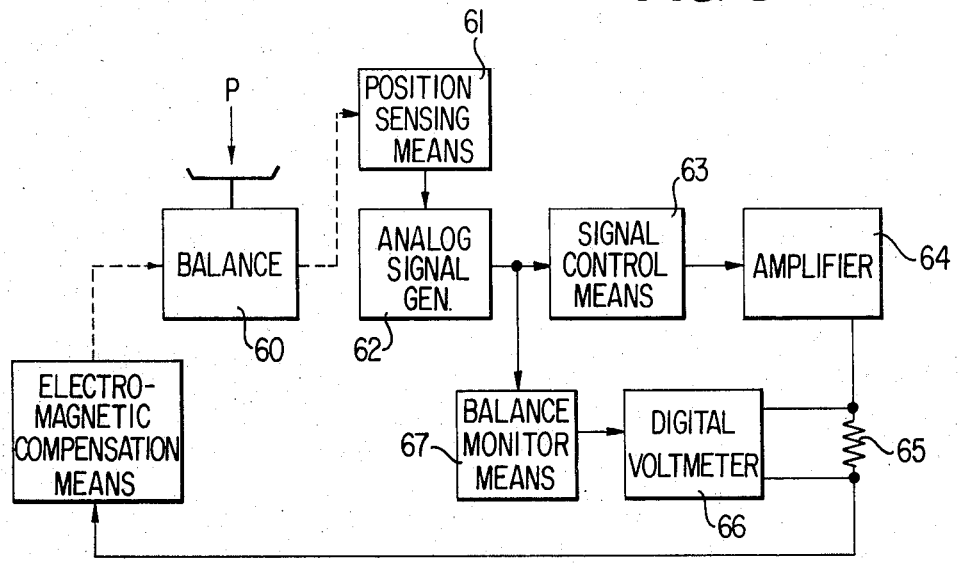
FIG. 6 is a block diagram of a second embodiment of the balance apparatus of the present invention.
Figure 7:
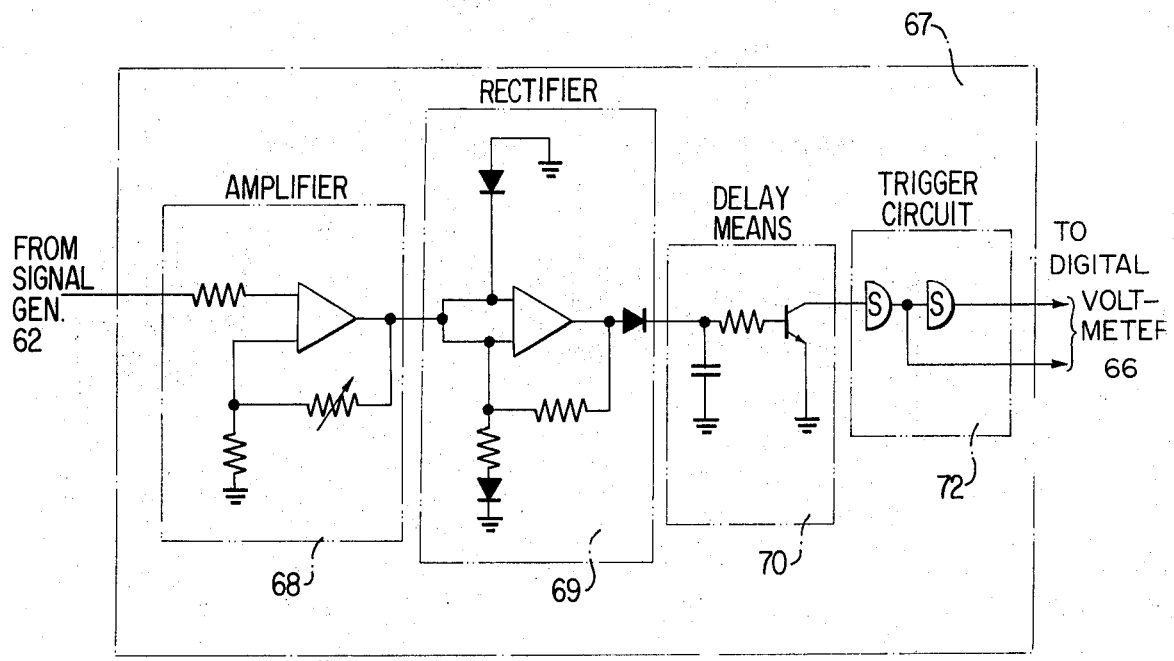
FIG. 7 is a detailed electrical schematic diagram of the balance monitoring means of FIG. 6.

Referring now to FIGS. 6 and 7, it will be seen that the basic construction of the second embodiment substantially corresponds to that of the first embodiment described above.

As shown in FIG. 6, the balance assembly has a balance 60 with a load-carrier means which is displaced from its zero position by a load P. This displacement produces in a position sensing means 61 and signal generating means 62 an alternating-current analog signal which is modified by signal control means 63 of the proportional-integral-derivative type, amplified by amplifier 64, and applied to the electromagnetic compensation means via measuring resistor 65 across which is connected the digital voltmeter 66. Thus, the magnitude of the current which holds the load-carrier means in its zero position is a measurement of the weight of the load P, and is digitally represented by means of a digital voltmeter 66 which measures the voltage drop across measuring resistor 65.

The mode of operation of the balance-condition monitoring means 67 (FIG. 7) is as follows. The signal from the position sensing means 61 and generator means 62 is passed to an amplifier 68 and rectified in a rectifier circuit 69. It then passes via delay means 70 into a trigger circuit 70, in the form of a Schmitt trigger, where the value of the signal is compared with a predetermined and adjustable threshold value.

The digital voltmeter 66 is again a device which counts the measuring voltage on the dual-slope principle. If, after the loadcarrier means of the balance 60 has almost settled into its rest or equilibrium condition, after the load P has been placed thereon, the signal from the position sensing means 61 is smaller than the above-mentioned threshold value, the trigger circuit 72 triggers the beginning of digitalization in the digital voltmeter 66. If the balance now remains (in relative terms) at rest, that is to say, the signal from the position sensing means 61 does not again arise above the above-mentioned threshold value, the weight of the load P is indicated in digitized form at the end of the measuring cycle. If however after the beginning of the measuring cycle the load-carrier means of the balance 60 again experiences inadmissibly high interference oscillations, such as vibration produced by external causes, the digital voltmeter 66 receives from the trigger circuit 72 a signal which interrupts the counting operation and re-sets the counter to zero. Only after the load-carrier means is again stabilized does there follow a fresh starting signal from the trigger 72, which sets off a new measuring cycle in the digital voltmeter 66.

For many cases it is of advantage for the trigger circuit 40 also to be provided with delay means 70, so that, after the alternating-current voltage signal from the position sensing means 61 has first dropped below the threshold value, further stabilization of the balance condition can occur before the trigger circuit 72 starts the digital voltmeter 66.

Figure 8:
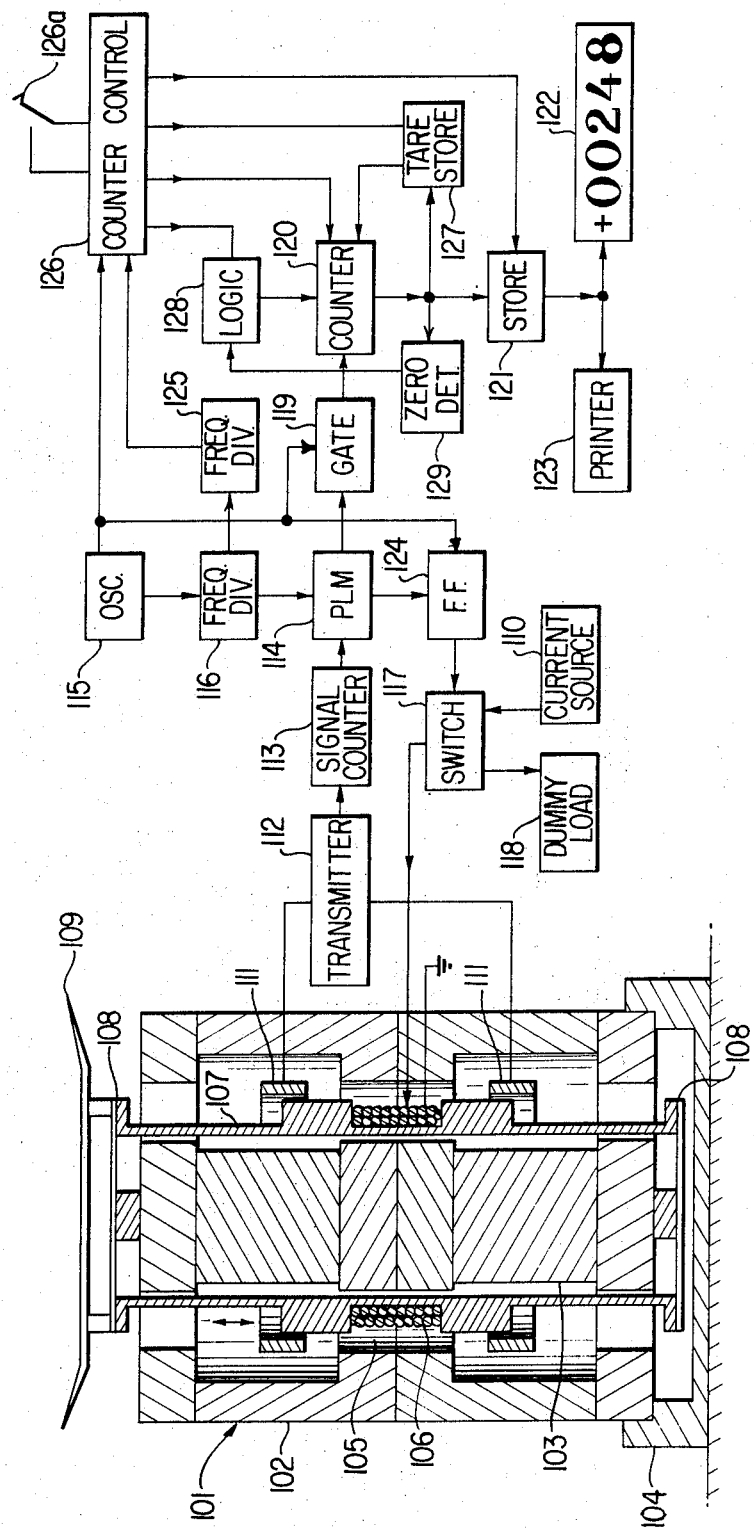
FIG. 8 is a block diagram illustrating a balance of the prior art provided with electromagnetic compensation means but without the balance monitoring means of the present invention.

The arrangement described above with reference to FIGS. 6 and 7 is also highly suitable for balances in which current is supplied in pulse form to the compensation coil and the length of the pulses is counted by means of high-frequency counting pulses. In this case also the trigger signals are passed to the corresponding counter control means. Referring to FIG. 8, which corresponds with the prior system disclosed in the aforementioned Allenspach U. S. application Ser. No. 244,054, the arrangement is such that the sum of the counting pulses of a multiplicity of individual measurements (for example 100 measurements, each of a duration of 2 ms) is formed for digital representation of the measurement result. This provides a higher degree of resolution and provides for better formation of a mean value. In that arrangement, the measuring cycles follow each other in a rigid sequence, that is to say, each cycle once begun is taken to its conclusion, whether it leads a meaningful result or not. In the balance assembly described herein however, the measuring cycles are triggered, that is to say, when the balance is in the "unstable" condition the cycle is immediately interrupted, and when the balance reaches the "stationary" condition the cycle is immediately set in operation again, and this can result in a saving in time which may be substantial.

While in accordance with the provision of the Patent Statutes, the best forms and embodiments have been illustrated and described, it will be apparent that various changes and modifications may be made without deviating from the inventive concepts set forth herein.

What is claimed is:

1. In a weighing apparatus including stationary and load-responsive movable components, means for generating a load signal as a function of the load applied to said load-responsive movable component, and load signal evaluation means periodically operable during successive measuring periods to produce digital measurement results that correspond with a given property of said load signal;

the improvement which comprises
balance monitoring means (14, 67) connected with said load signal generating means for disabling said load signal evaluation means when the movement of said movable component exceeds at least one of a set of predetermined limits relative to said stationary component during a given measurement period.

2. Apparatus as defined in claim 1, and further including means (18) for adjusting said predetermined limits.

3. Apparatus as defined in claim 1, and further including signal indicator means (12a) operable from a first condition to a second condition by said balance monitor means at the end of a measurement period during which the movable component remained within its defined limits.

4. Apparatus as defined in claim 1, and further including data storage means (13) for storing digitalized results; said balance monitoring means being operable at the end of a measuring period during which said predetermined limits have not been exceeded to cause said load signal evaluation means to transmit to the storage means the digitalized measurement that was achieved during said measuring period.

5. Apparatus as defined in claim 1, wherein said balance monitoring means (67) further includes trigger means (72) for enabling said evaluation means when the movement of said movable component returns within said predetermined limits.

6. Apparatus as defined in claim 5, wherein said balance monitoring means further includes time delay means for delaying for a given period of time after the movement of said movable component has returned within said predetermined limits the enabling of said load signal evaluation means.

7. Apparatus as defined in claim 5, wherein said balance monitoring means resets the load signal evaluation means to zero when the movement of the movable component exceeds said predetermined limits.

8. Apparatus as defined in claim 7, and further including means operable when the movement of said movable component returns within said predetermined limits during said measuring cycle for reactivating said load signal evaluation means, whereby the necessity of waiting for the expiration of the former measuring cycle is eliminated.

9. Apparatus as defined in claim 1, and further including means (23b) for defining within said first set of limits a lower set of predetermined limits for controlling the operation of said evaluation means.

10. Apparatus as defined in claim 9, and further including means (FF2) for disabling said evaluation means at the end of a given measuring period during which the lower limits were exceeded an uneven number of times.

11. Apparatus as defined in claim 9, and further including first bistable means (FF1) operable from a first condition to a second condition when the movable component exceeds said first predetermined limits during a given measuring period, second bistable means (FF2) operable alternately between first and second conditions each time during said given measuring period the movable component exceeds said lower predetermined limits, and means (FF3) for generating a presignal when said first and second bistable means are in their first and second conditions, respectively, at the end of said given measuring period.

12. Apparatus as defined in claim 11, and further including means (FF4) for generating a standstill signal after a predetermined time delay period following the generation of said presignal, said evaluation means being operable by said standstill signal to deliver a valid digitalized measurement result obtained during said given measuring period.

* * * * *